Nov. 16, 1948.     F. W. SEYBOLD     2,454,014
TRANSMISSION
Filed Feb. 21, 1945     17 Sheets-Sheet 1

INVENTOR
Frederick W. Seybold

Nov. 16, 1948.    F. W. SEYBOLD    2,454,014
TRANSMISSION
Filed Feb. 21, 1945    17 Sheets-Sheet 2

FIG. 2.

| SPEED RATIO | CLUTCH ENGAGEMENT | | | TORQUE RATIOS - ENGINE TORQUE = 100 | | | | | | | | | POWER DELIVERED THRU | |
|---|---|---|---|---|---|---|---|---|---|---|---|---|---|---|
| | CLUTCH A | CLUTCH B | CLUTCH C | CLUTCH A | CLUTCH B | CLUTCH C | INTERNAL GEAR | REACTION GEAR | CARRIER | FEEDBACK PINION | FLUID COUPLING | OUTPUT SHAFT | FLUID COUPLING | DIRECT |
| LOW 2.33:1 | ON | OFF | OFF | 100 | 0 | 0 | 200 | 133 | 333 | 100 | 100 | 233 | 100% | 0 |
| INT. 1.67:1 | OFF | ON | OFF | 0 | 71 | 0 | 100 | 67 | 238 | 71 | 100 | 167 | 100% | 0 |
| HIGH 1:1 | ON | OFF | ON | 43 | 0 | 57 | 86 | 57 | 143 | 43 | 43 | 100 | 43% | 57% |
| REV. 2.34:1 | ON | OFF | OFF | 100 | 0 | 0 | 0 | 0 | -334 | 100 | 100 | -234 | 100% | 0 |

FIG. 4.

| SPEED RATIO | CLUTCH ENGAGEMENT | | | TORQUE RATIOS - ENGINE TORQUE = 100 | | | | | | | | | % POWER DELIVERED THRU | |
|---|---|---|---|---|---|---|---|---|---|---|---|---|---|---|
| | CLUTCH A | CLUTCH B | CLUTCH C | CLUTCH A | CLUTCH B | CLUTCH C | INTERNAL GEAR | REACTION GEAR | CARRIER | FEEDBACK PINION | FLUID COUPLING | OUTPUT SHAFT | FLUID COUPLING | DIRECT |
| LOW 2.33:1 | ON | OFF | OFF | 100 | 0 | 0 | 200 | 133 | 333 | 100 | 100 | 233 | 100% | 100% |
| INT. 1.67:1 | OFF | ON | OFF | 0 | 71 | 0 | 100 | 67 | 238 | 71 | 0 | 167 | 0 | 100% |
| HIGH 1:1 | ON | ON | OFF | 100 | 143 | 0 | 0 | 0 | 143 | 43 | 100 | 100 | 100% | 0 |
| HIGH 1:1 | ON | OFF | ON | 43 | 0 | 57 | 86 | 57 | 143 | 43 | 43 | 100 | 43% | 100% |
| HIGH 1:1 | OFF | ON | ON | 0 | 43 | 40 | 60 | 40 | 143 | 43 | 0 | 100 | 0 | 100% |
| REV. 2.34:1 | ON | OFF | OFF | 100 | 0 | 0 | 0 | 0 | -334 | 100 | 100 | -234 | 100% | 0 |

INVENTOR
Frederick W. Seybold

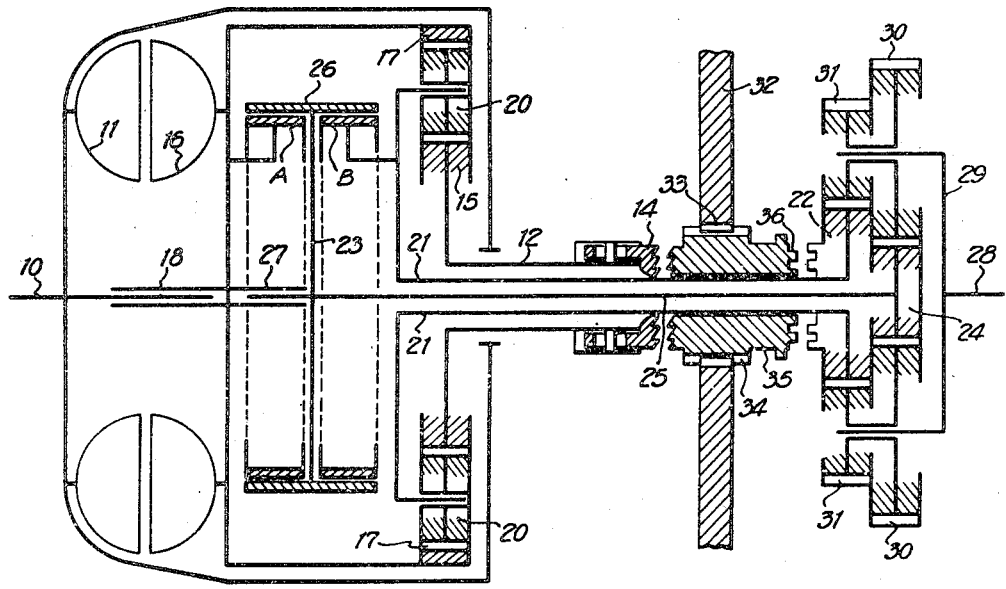
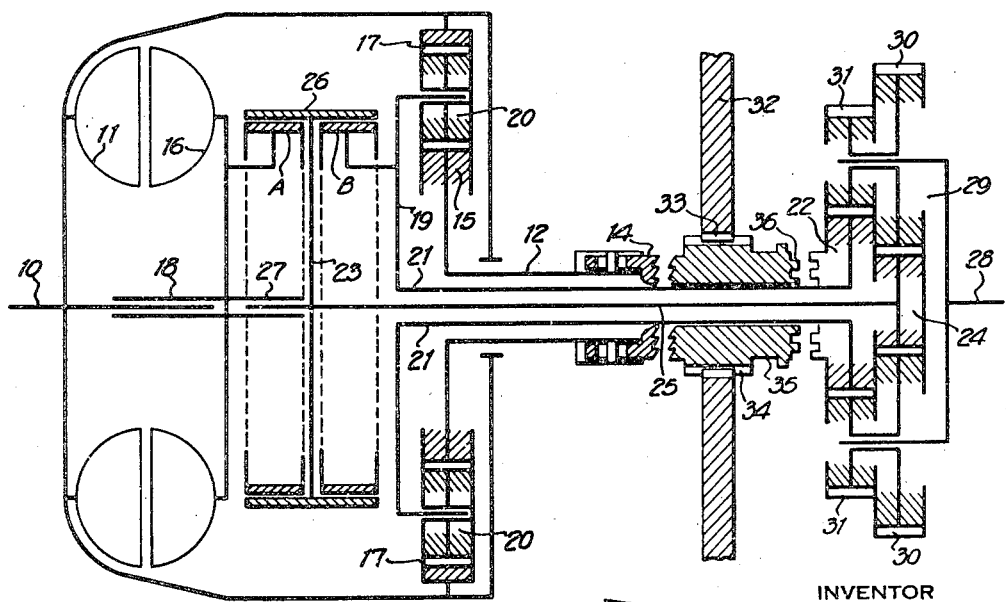

Nov. 16, 1948.  F. W. SEYBOLD  2,454,014
TRANSMISSION
Filed Feb. 21, 1945  17 Sheets-Sheet 4

FIG. 6.

| SPEED RATIO | CLUTCH ENGAGEMENT | | TORQUE RATIOS - ENGINE TORQUE = 100 | | | | | | | | % POWER DELIVERED THRU | |
|---|---|---|---|---|---|---|---|---|---|---|---|---|
| | CLUTCH A | CLUTCH B | CLUTCH A | CLUTCH B | INTERNAL GEAR | REACTION GEAR | CARRIER | FEED-BACK PINION | FLUID COUPLING | OUTPUT SHAFT | FLUID COUPLING | DIRECT |
| LOW 2.33:1 | ON | OFF | 100 | 0 | 200 | 133 | 333 | 100 | 100 | 233 | 100% | 0 |
| INT. 1.67:1 | OFF | ON | 0 | 71 | 100 | 67 | 238 | 71 | 100 | 167 | 100% | 0 |
| HIGH 1:1 | ON | ON | 100 | 143 | 0 | 0 | 143 | 43 | 100 | 100 | 100% | 0 |
| REV. 2.34:1 | ON | OFF | 100 | 0 | 0 | 0 | -334 | 100 | 100 | -234 | 100% | 0 |

FIG. 8.

| SPEED RATIO | CLUTCH ENGAGEMENT | | TORQUE RATIOS - ENGINE TORQUE = 100 | | | | | | | | % POWER DELIVERED THRU | |
|---|---|---|---|---|---|---|---|---|---|---|---|---|
| | CLUTCH A | CLUTCH B | CLUTCH A | CLUTCH B | INTERNAL GEAR | REACTION GEAR | CARRIER | FEED-BACK PINION | FLUID COUPLING | OUTPUT SHAFT | FLUID COUPLING | DIRECT |
| LOW 2.33:1 | ON | OFF | 100 | 0 | 200 | 133 | 333 | 100 | 100 | 233 | 100 | 100 |
| INT. 1.67:1 | OFF | ON | 0 | 71 | 100 | 67 | 238 | 71 | 0 | 167 | 0 | 100 |
| HIGH 1:1 | ON | ON | 100 | 143 | 0 | 0 | 143 | 43 | 100 | 100 | 100 | 0 |
| REV. 2.34:1 | ON | OFF | 100 | 0 | 0 | 0 | -334 | 100 | 100 | -234 | 100 | 0 |

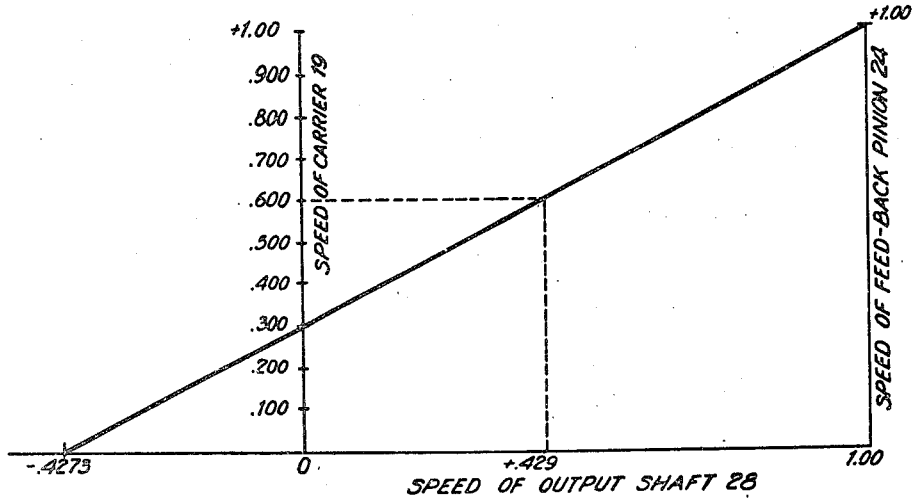

FIG. 9.

INVENTOR
Frederick W. Seybold

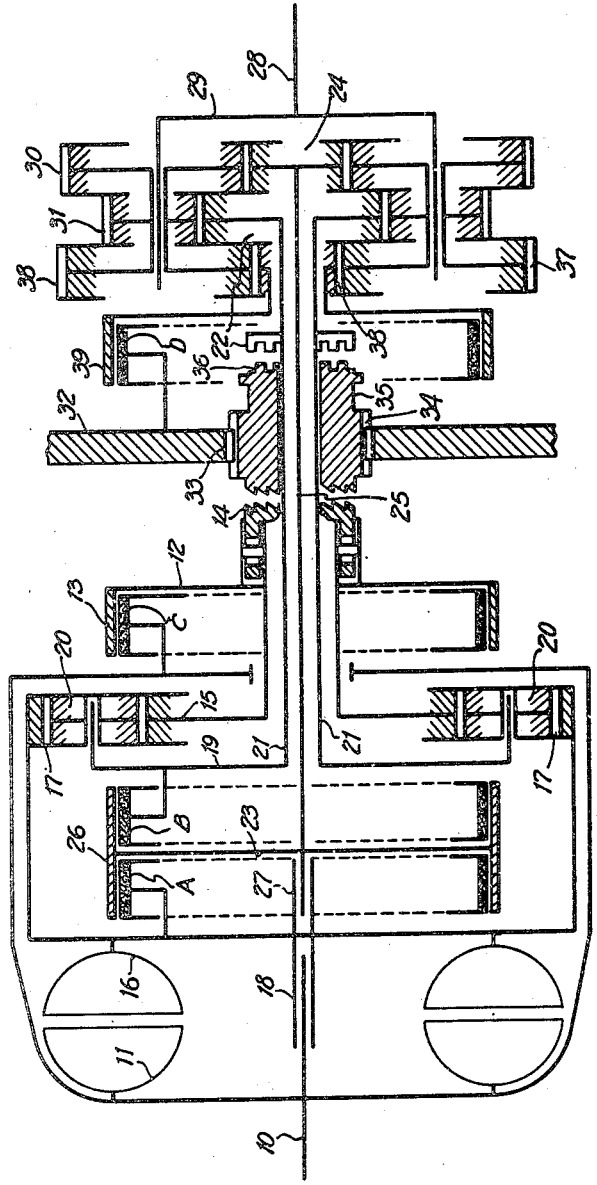

Fig. 11.

| SPEED RATIO | CLUTCH ENGAGEMENT ||||| TORQUE RATIOS – ENGINE TORQUE = 100 |||||||| % POWER DELIVERED THRU ||
|---|---|---|---|---|---|---|---|---|---|---|---|---|---|---|---|
| | CLUTCH A | CLUTCH B | CLUTCH C | CLUTCH D | CLUTCH C | CLUTCH A | CLUTCH B | CLUTCH D | CLUTCH C | INTERNAL GEAR | REACTION GEARS | CARRIER | FEED-BACK PINIONS | FLUID COUPLING | OUTPUT SHAFT | FLUID COUPLING | DIRECT |
| LOW 2.33:1 | ON | OFF | OFF | OFF | OFF | 100 | 0 | 0 | 0 | 200 | 133 | 333 | 100 | 100 | 233 | 100% | 0 |
| 1st INT. 1.67:1 | OFF | ON | OFF | OFF | OFF | 0 | 71 | 0 | 0 | 100 | 67 | 238 | 71 | 100 | 167 | 100% | 0 |
| 2nd INT. 1.31:1 | OFF | OFF | ON | OFF | OFF | 0 | 0 | 36 | 0 | 100 | 67 | 167 | 36 | 100 | 131 | 100% | 0 |
| HIGH 1:1 | ON | OFF | OFF | ON | OFF | 43 | 0 | 0 | 57 | 86 | 57 | 143 | 43 | 43 | 100 | 43% | 57% |
| OV.DR. .79:1 | OFF | OFF | OFF | ON | ON | 0 | 0 | 21 | 40 | 60 | 40 | 100 | 21 | 60 | 79 | 60% | 40% |
| REV. 2.34:1 | ON | OFF | OFF | OFF | OFF | 100 | 0 | 0 | 0 | 0 | 0 | -334 | 100 | 100 | -234 | 100% | 0 |

Fig. 13.

| SPEED RATIO | CLUTCH ENGAGEMENT ||||| TORQUE RATIOS – ENGINE TORQUE = 100 |||||||| % POWER DELIVERED THRU ||
|---|---|---|---|---|---|---|---|---|---|---|---|---|---|---|---|
| | CLUTCH A | CLUTCH B | CLUTCH C | CLUTCH D | CLUTCH C | CLUTCH A | CLUTCH B | CLUTCH D | CLUTCH C | INTERNAL GEAR | REACTION GEAR | CARRIER | FEED-BACK PINION | FLUID COUPLING | OUTPUT SHAFT | FLUID COUPLING | DIRECT |
| LOW 2.33:1 | ON | OFF | OFF | OFF | OFF | 100 | 0 | 0 | 0 | 200 | 133 | 333 | 100 | 100 | 233 | 100% | 100% |
| 1st INT. 1.67:1 | OFF | ON | OFF | OFF | OFF | 0 | 71 | 0 | 0 | 100 | 67 | 238 | 71 | 0 | 167 | 0 | 100% |
| 2nd INT. 1.31:1 | OFF | OFF | ON | OFF | OFF | 0 | 0 | 36 | 0 | 100 | 67 | 167 | 36 | 0 | 131 | 0 | 100% |
| HIGH 1:1 | ON | OFF | OFF | ON | OFF | 43 | 0 | 0 | 57 | 86 | 57 | 143 | 43 | 43 | 100 | 43% | 100% |
| OV.DR. .79:1 | OFF | OFF | OFF | ON | ON | 0 | 0 | 21 | 40 | 60 | 40 | 100 | 21 | 0 | 79 | 0 | 100% |
| REV. 2.34:1 | ON | OFF | OFF | OFF | OFF | 100 | 0 | 0 | 0 | 0 | 0 | -334 | 100 | 100 | -234 | 100% | 0 |

INVENTOR
Frederick W. Seybold

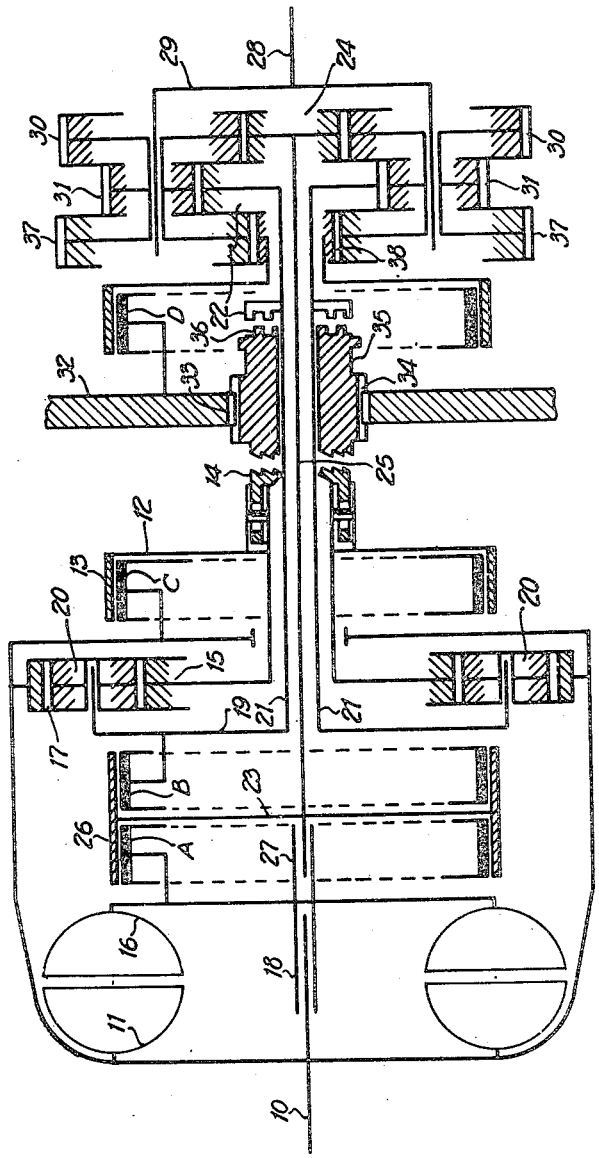

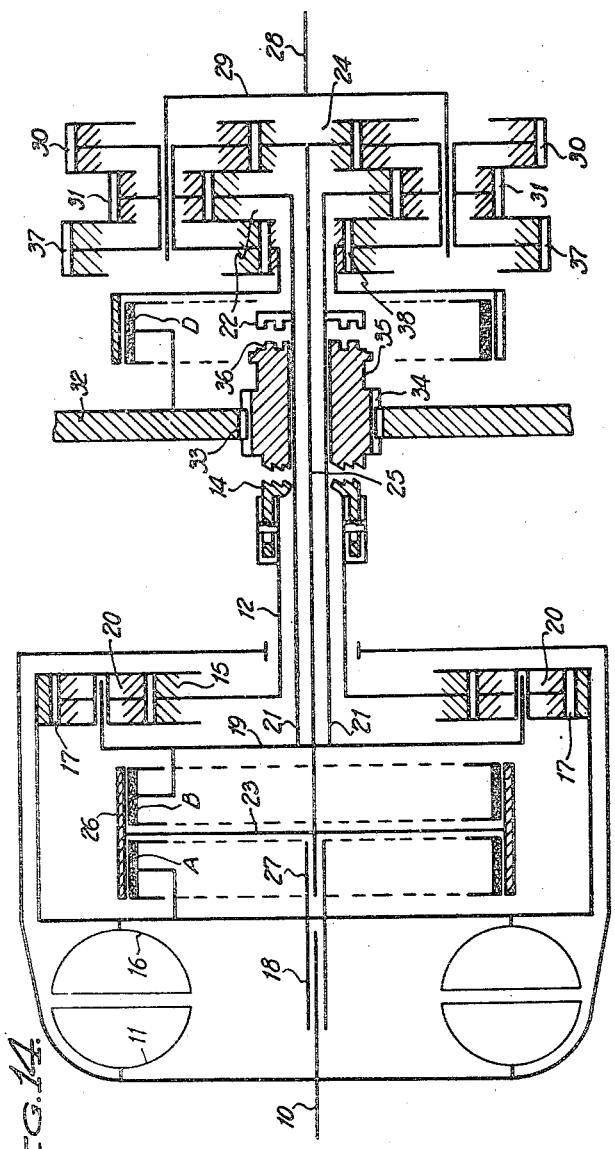

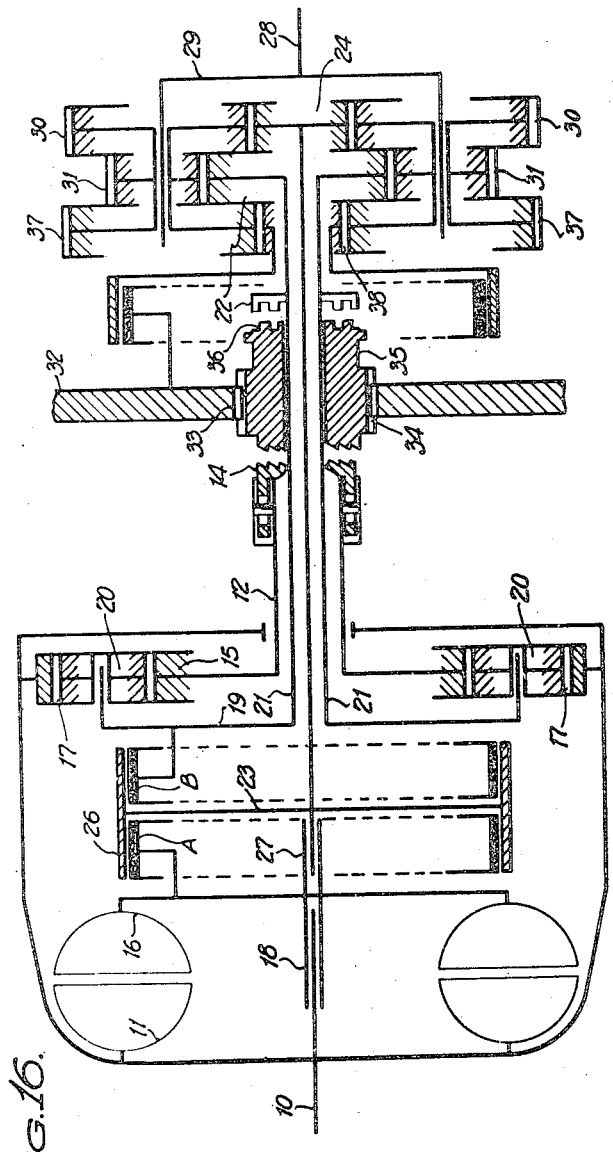

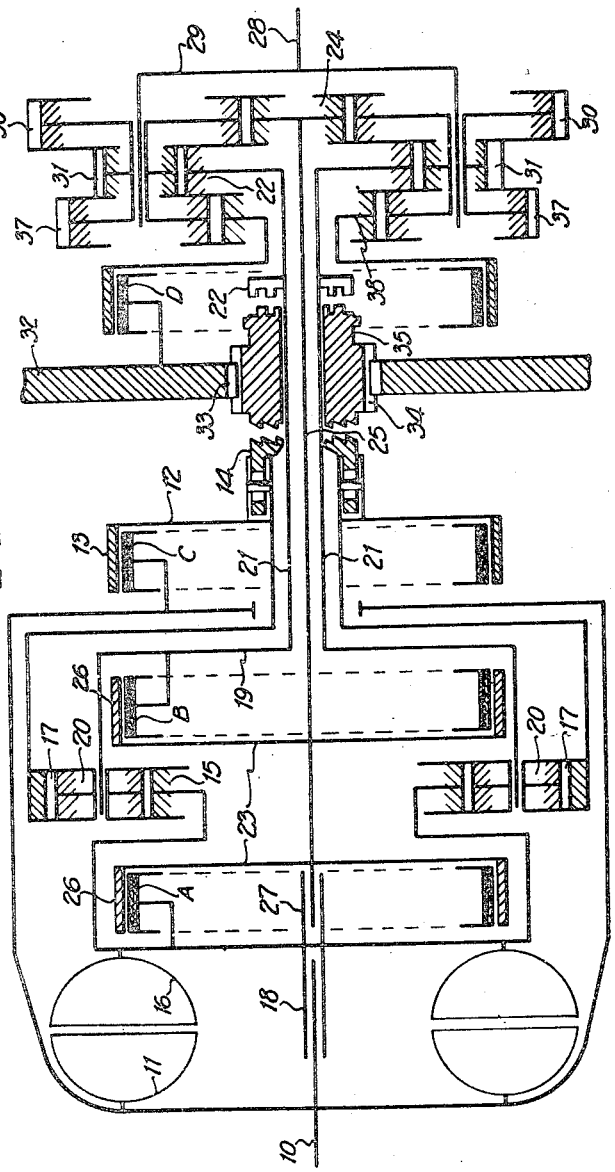

Nov. 16, 1948.  F. W. SEYBOLD  2,454,014
TRANSMISSION
Filed Feb. 21, 1945  17 Sheets-Sheet 11
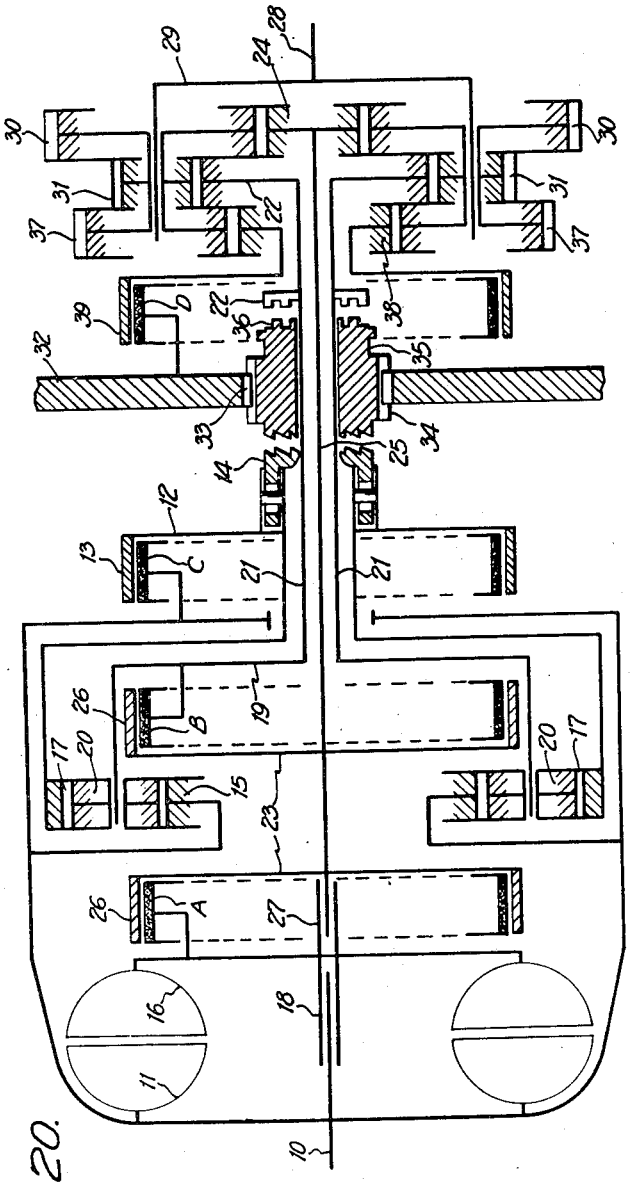
INVENTOR
Frederick W. Seybold.

INVENTOR
Frederick W. Seybold

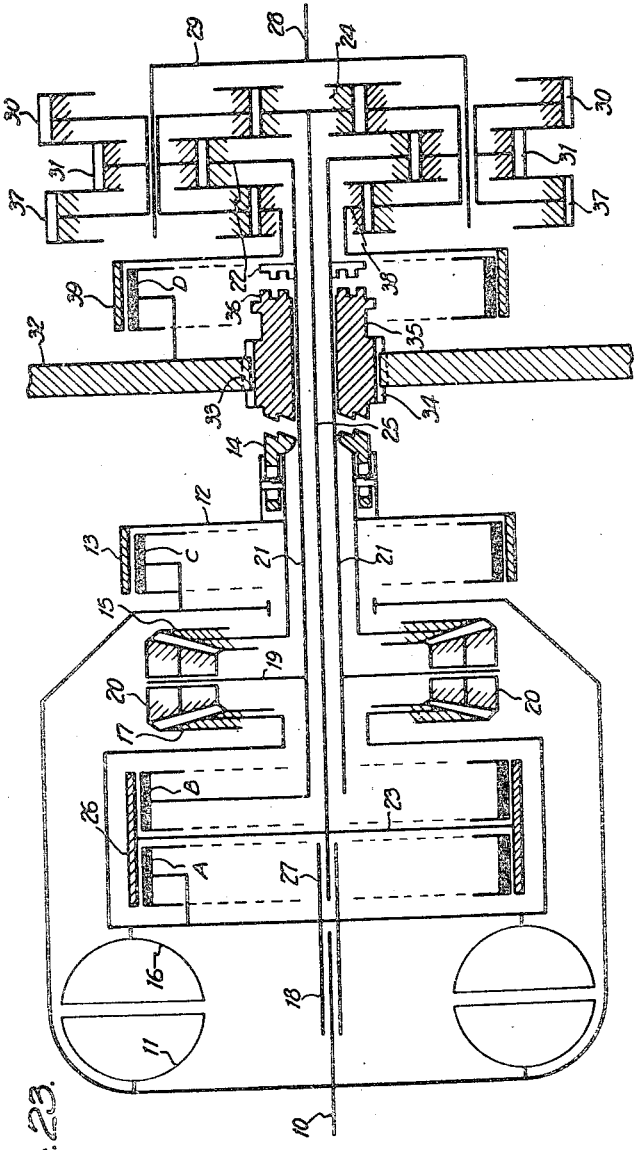

| SPEED RATIO | CLUTCH ENGAGEMENT | | | | TORQUE RATIOS — ENGINE TORQUE = 100 | | | | | | % POWER DELIVERED THRU | |
|---|---|---|---|---|---|---|---|---|---|---|---|---|
| | CLUTCH A | CLUTCH B | CLUTCH C | CLUTCH D | CLUTCH A | CLUTCH B | CLUTCH C | CLUTCH D | INPUT BEVEL | REACTION BEVEL | CARRIER | FEED-BACK PINION | FLUID COUPLING | OUTPUT SHAFT | FLUID COUPLING | DIRECT |
| LOW 3:1 | ON | OFF | OFF | OFF | 100 | 0 | 0 | 0 | 200 | 200 | 400 | 100 | 100 | 300 | 100 | 0 |
| 1st INT. 2:1 | OFF | ON | OFF | OFF | 0 | 67 | 0 | 0 | 100 | 100 | 267 | 67 | 100 | 200 | 100 | 0 |
| 2nd INT. 1.42:1 | OFF | OFF | OFF | ON | 0 | 0 | 0 | 58 | 100 | 100 | 200 | 58 | 100 | 142 | 100 | 0 |
| HIGH 1:1 | ON | OFF | ON | OFF | 34 | 0 | 67 | 0 | 67 | 67 | 134 | 34 | 33 | 100 | 33 | 67 |
| OV.DR. 7:1 | OFF | OFF | ON | ON | 0 | 0 | 50 | 29 | 50 | 50 | 100 | 29 | 50 | 71 | 50 | 50 |
| REV. 3:1 | ON | OFF | OFF | OFF | 100 | 0 | 0 | 0 | 0 | 0 | -400 | 100 | 100 | -300 | 100 | 0 |

INVENTOR
Frederick W. Seybold

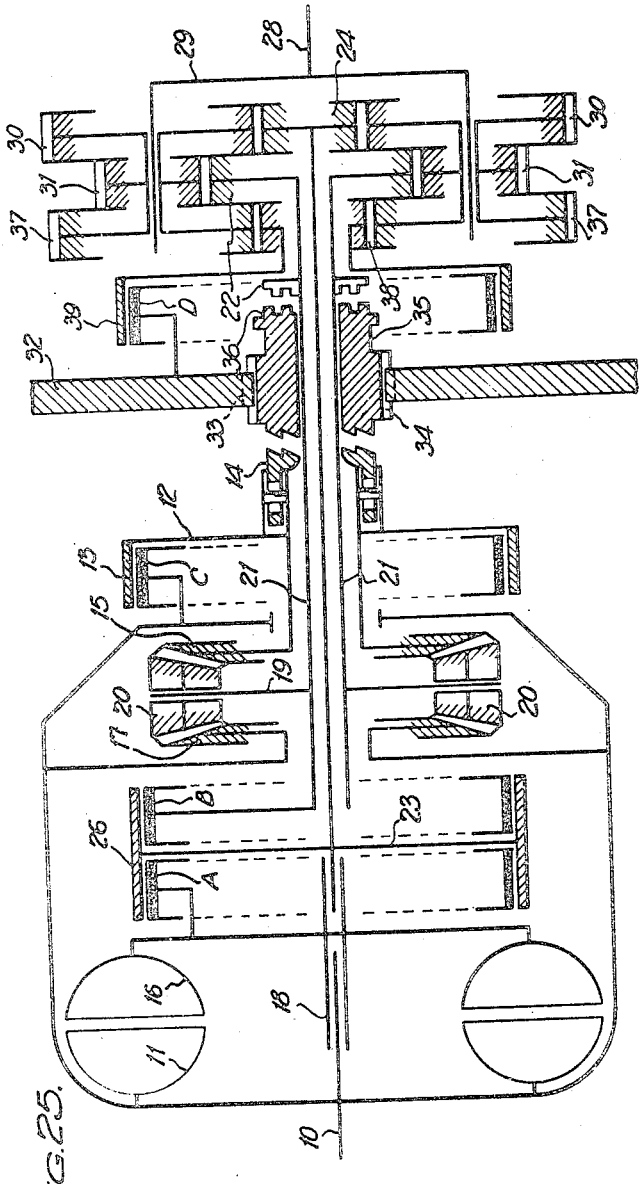

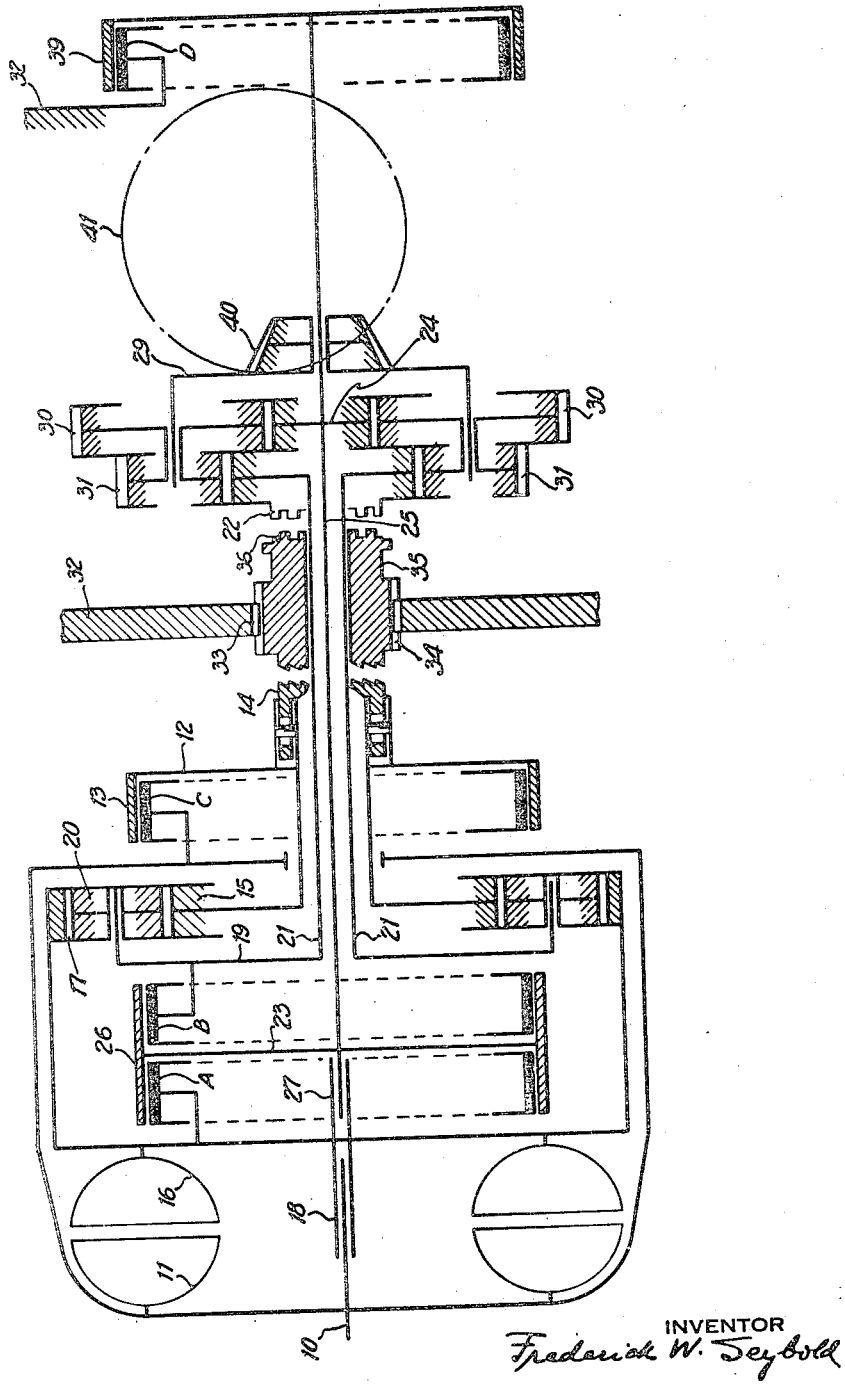

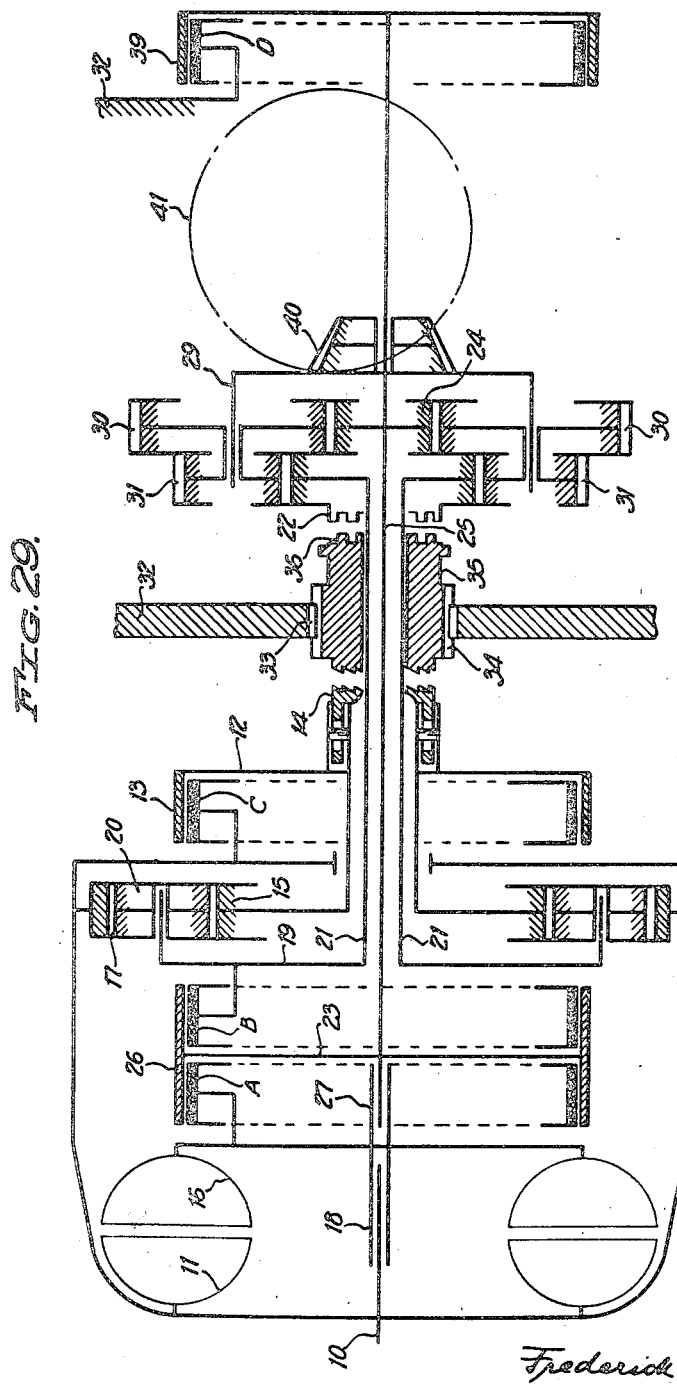

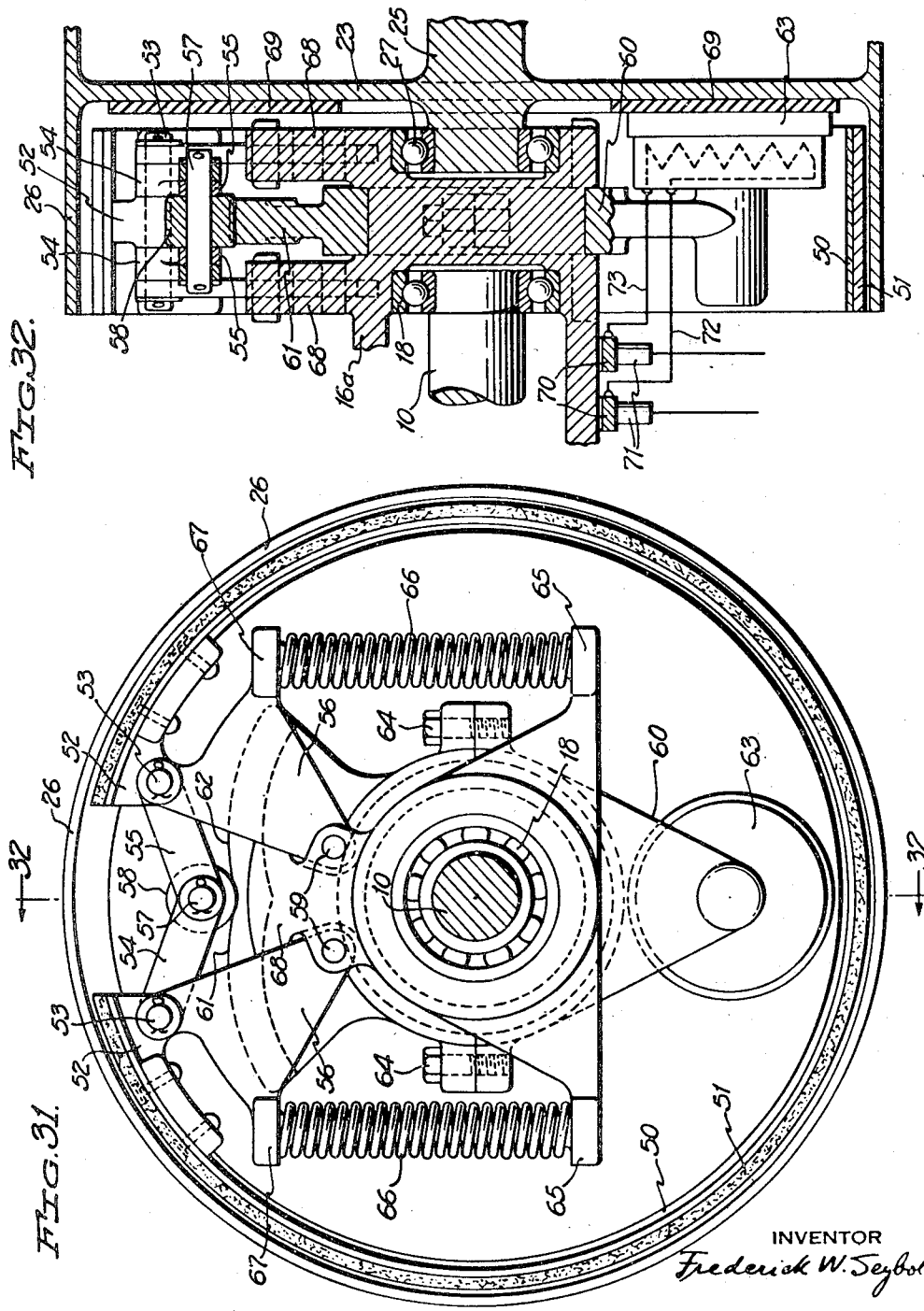

Patented Nov. 16, 1948

2,454,014

UNITED STATES PATENT OFFICE 2,454,014

TRANSMISSION

Frederick W. Seybold, Westfield, N. J.

Application February 21, 1945, Serial No. 579,052

27 Claims. (Cl. 74—189.5)

The present invention pertains to variable speed transmissions and in particular to transmissions or torque converters designed and constructed to vary the speed and torque ratios between the driving and the driven shaft of a motor vehicle, although well adapted for use in other mechanisms where variable speed transmissions are customarily employed.

The present invention lends itself to a variety of combinations in regard to the number of speed ratios in which the power may be transmitted through a fluid coupling in all speed ratios or directly through gears in some of the forward ratios or the power may be transmitted partly through a fluid coupling and partly through the gears directly whereby the fluid coupling will operate at a higher efficiency especially in direct and overdrive resulting in greater economy of operation.

A further object of this invention is to provide a transmission in which the fluid coupling serves as a cushion to practically eliminate any shock during clutch engagements, and in some of the speed ratios the coupling serves as a feed-back or regenerative power element.

Another object of this invention is to provide a self-engaging and self-disengaging clutch to lock or unlock the reaction element of the transmission gearing respectively depending on the direction of the applied torque.

A still further object of this invention is to provide a transmission in which the transmission ratios are approximately in geometric progression.

The novel transmission is further characterized by the design of the power and torque transmission gearing and clutch arrangement in such manner that the output shaft may remain stationary without being subjected to drag torque from the fluid coupling and in which the output shaft may be made to rotate in the opposite direction from that in which the input shaft rotates without the necessity of an auxiliary gear set.

It is a still further object of this invention to provide novel magnetically operated friction clutches which are actuated by the usual 6 volt battery circuit requiring not more than 2 amperes for their continuous operation. However, hydraulic or mechanical operation of the clutches can be substituted with equal facility and the sequence of clutch operation may be either automatic or at the option of the operator.

The invention includes other novel features of construction the accumulative effect of which is to render it eminently practical and superior in operation to those heretofore designed or suggested. In adapting it, numerous minor changes in the design and arrangement of its component elements may be effected without departing from the scope of the invention.

Several preferred forms in which the invention can be incorporated are illustrated in the accompanying drawings in which:

Figure 2 shows the tabulation of the various speeds, clutch engagements and torque ratios impressed on the various components of the transmission shown in Figure 1;

Figure 4 shows the tabulation of the various speeds, clutch engagements and torque ratios impressed on the different component parts of the transmission shown in Figure 3;

Figure 5 is a diagrammatic vertical section thru another simplified form of the invention;

Figure 6 shows the tabulation of the various speeds, clutch engagements and torque ratios occurring in the transmission shown in Figure 5;

Figure 7 is a diagrammatic vertical section of a modfied form of the transmission shown in Figure 5;

Figure 8 shows the tabulation of the various speeds, clutch engagements and torque ratios of the transmission shown in Figure 7;

Figure 9 shows the relation of the speed of the output shaft when the speed of the feed-back pinion remains constant and the speed of the planet carrier is varied;

Figure 10 is a diagrammatic vertical section thru a 5-speed forward, single reverse form of transmission;

Figure 11 shows the tabulation of the various speeds, clutch engagements and torque ratios of the different elements of the transmission shown in Figure 10;

Figure 12 is a diagrammatic vertical section of a modified form of the transmission shown in Figure 10;

Figure 13 shows the tabulation of the speeds, clutch engagements and torque ratios pertaining to this modified form shown in Figure 12;

Figure 14 is a diagrammatic vertical section of a simplified form of the transmission shown in Figure 10;

Figure 15 shows the tabulation of speeds, clutch engagements and torque ratios pertaining to the transmission shown in Figure 14;

Figure 16 is a diagrammatic vertical section of a modified form of the transmission shown in Figure 14;

Figure 17 shows the tabulation of the speeds, clutch engagements and torque ratios of the transmission shown in Figure 16;

Figure 18 is a diagrammatic vertical section of another modification of a 5-speed forward, single reverse type of transmission;

Figure 19 shows the tabulation of the speeds, clutch engagements and torque ratios of the transmission shown in Figure 18;

Figure 20 is a diagrammatic vertical section of a modified form of the transmission shown in Figure 18;

Figure 21 shows the tabulation of the speeds, clutch engagements and torque ratios of the transmission shown in Figure 20;

Figure 23 is a diagrammatic vertical section of still another form employing bevel gears;

Figure 24 shows the tabulation of the speeds, clutch engagements and torque ratios of the transmission shown in Figure 23;

Figure 25 is a diagrammatic vertical section thru a modified form of the transmission shown in Figure 23;

Figure 26 shows the tabulation of the speeds, clutch engagements and torque ratios of the mechanism shown in Figure 25;

Figure 28 is a diagrammatic vertical section of another modified form of the transmission shown in Figure 1 which is particularly suited for rear engine applications and in addition provides an overdrive ratio;

Figure 29 is a diagrammatic vertical section of a modified form of the transmission shown in Figure 28;

Figure 31 is a detail view of one of the magnetically operated friction clutches which can advantageously be employed in the construction of the transmission;

Figure 32 is a view taken on section 32—32 of Figure 31.

Figure 1:
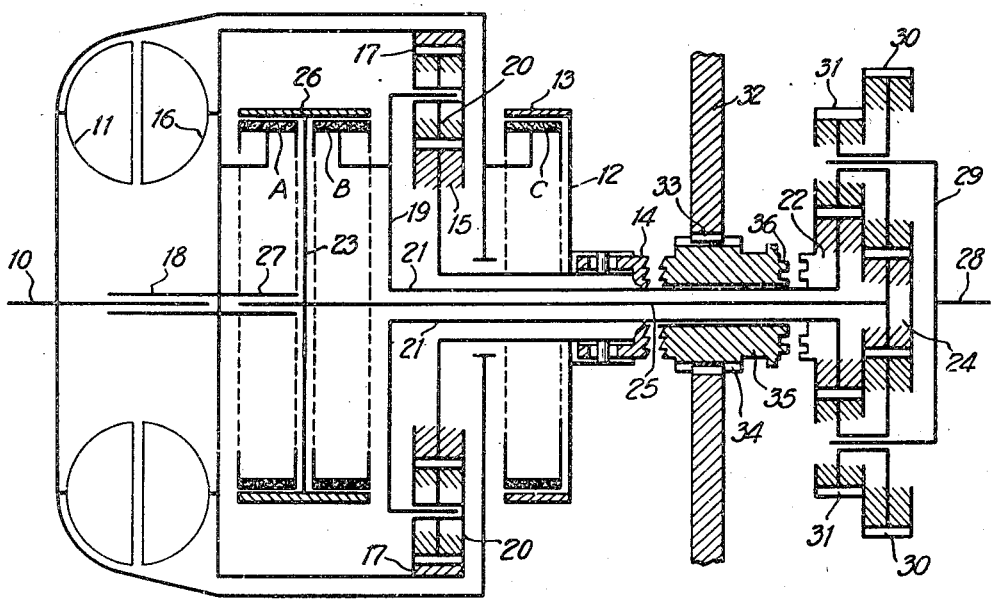
Figure 1 is a diagrammatic vertical section thru one form of a 3-speed forward, single reverse transmission.

Referring to the drawings in detail all such minor details as anti-friction bearings, screws, etc. have purposely been omitted and as a diagrammatic drawing lends itself to easier understanding and comprehension of the various forms and modifications thereof the description will be confined to the major details only and like parts are indicated by the same numeral in the different figures.

In Figure 1 the input shaft 10 is connected to one element 11 of a fluid coupling and it has clutch means C for connecting the drive shaft to the reaction element 12 which consists of the clutch drum 13, the self-engaging and self-disengaging brake 14 which will be described in greater detail later and the sun gear 15.

The other element 16 of the fluid coupling is directly connected to the internal gear 17 and the clutch means A and is journalled at 18 on an extension of the drive shaft 10. A planet carrier 19 carries two or more planet pinions 20 which mesh with the internal gear 17 and the reaction sun gear 15. This carrier is also provided with the clutch means B and has a tubular section 21 which terminates at its right end with the brake gear 22. The feed-back element 23 carries at its right end the pinion 24 on a shaft 25 which is journalled in the tubular section 21 and on the left end of the shaft 25 the double clutch drum 26 is secured. A further bearing for the shaft 25 may be provided in the fluid coupling member 16 at 27.

The driven element 28 consists of the planet carrier 29 on which the integral planet pinions 30—31 are journalled. The pinions 30—31 mesh with the feed-back pinion 24 and with the brake gear 22 respectively.

In the stationary transmission case indicated by 32 a multiple spline bore 33 is provided in which the double jaw brake 34 is slidably mounted, whereby this brake may be alternately engaged with members 14 and 22 by well-known means such as a shifting fork which operates in the groove 35 of the brake 34 thru a suitable linkage connection to the steering wheel column.

For example, the number of teeth in the various gears may be as follows:

| | Teeth |
|---|---|
| Internal gear 17 | 72 |
| Sun gear 15 | 48 |
| Planet gears 20 | 12 |
| Brake gear 22 | 53 |
| Feed-back pinion 24 | 29 |
| Planet gear 30 | 53 |
| Planet gear 31 | 29 |

In Figure 2 the clutch engagements of the three clutches A, B and C for the various speed ratios are tabulated as well as the torque ratios in terms of engine torque=100 and it is to be noted that the torque of the clutch does not exceed the engine torque, and this is a particular feature of this invention. The flow of engine power in the form illustrated in Figure 1 is 100% thru the fluid coupling in all speed ratios except in direct drive where 57% of the engine power is applied to the sun gear 15, and 43% of the engine power passes thru the fluid coupling 11—16 to the internal gear 17 which also receives a regenerative or feed-back torque from the element 24 thru clutch A.

The fluid coupling is, of course, designed so that it is capable of transmitting the entire engine torque with about 2–3% slip, therefore, in direct drive the slip will be reduced to about 1% as the coupling transmits only 43% of the engine torque and the transmission still benefits from the cushioning effect of a hydraulic coupling.

Figure 3:
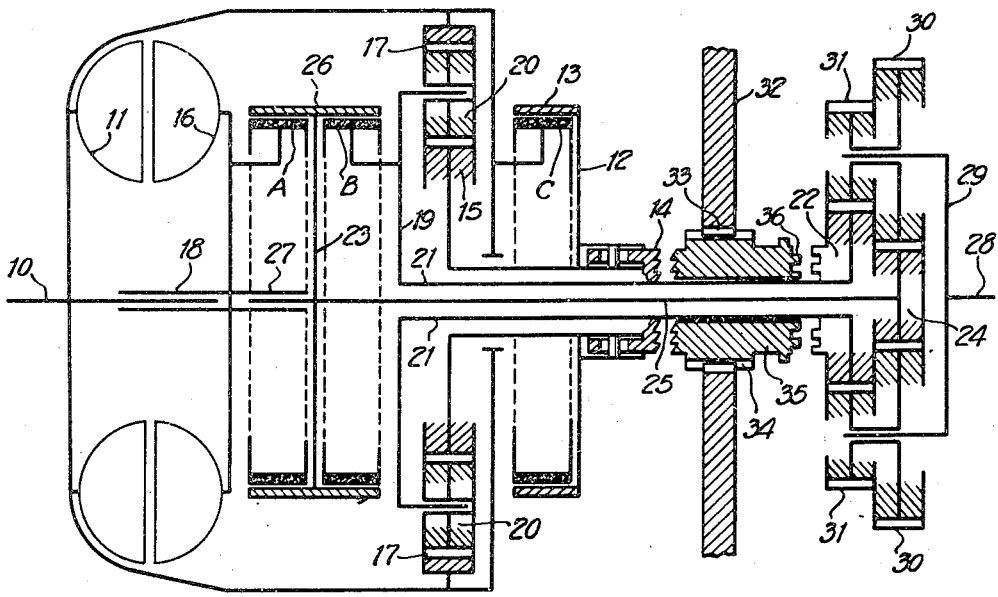
Figure 3 is a diagrammatic vertical section of a modified form of that shown in Figure 1.

The form of the transmission shown in Figure 3 differs from the construction shown in Figure 1 with respect to the internal gear 17 only, which is now directly connected to the drive shaft 10 and the fluid coupling member 11 instead of being connected to the fluid coupling member 16.

An inspection of the table, Figure 4 will show that the mode of power transmission in the various speed ratios has been affected considerably. In the low gear ratio the engine power is applied 100% to the gear 17 which in addition receives an equal amount of regenerated or feed-back power from the pinion 24, thru the clutch A and the fluid coupling 16—11.

In the intermediate gear ratio all of the engine power is applied to the internal gear 17 but the feed-back power from the pinion 24 passes thru the clutch B to the carrier 19 and clutch gear 22.

In direct drive three different modes of transmitting the engine power become available, i. e., it may be transmitted 100% thru the fluid coupling, or 100% direct to internal gear 17 and sun gear 15 with regenerated power from the pinion 24 passing to the carrier 19 thru the clutch B, or finally the regenerated power may be passed thru clutch A and the fluid coupling 16—11 to the internal gear 17, in order to benefit from the cushioning effect of the fluid coupling.

In reverse drive the engine power is applied to the fluid coupling 11 which now is the impeller driving the runner 16 and thru the clutch A transmits the power to pinion 24. The brake gear 22 is held stationary by the brake teeth 36 of the double jaw brake 34 and rotation of the pinion 24 results in rotation in the opposite direction of the planet carrier 29 and the driven shaft 28.

The form of the transmission illustrated in Figure 5 omits the clutch C and clutch drum 13 of the two preceding constructions, and in all other respects is like the construction of Figure 1. The engine power is transmitted in all driving ratios entirely thru the fluid coupling 11—16, no direct power application to the gearing is available due to the omission of the clutch C, see Figure 6.

A modified form is shown in Figure 7 where the internal gear 17 is directly connected to the drive shaft 10 and the fluid coupling member 11, which makes it possible to apply the entire engine power directly to the gearing in the low and intermediate driving ratios, whereas in direct drive and reverse the entire engine power passes thru the fluid coupling. In the low gear ratio the fluid coupling serves as a power regenerative unit and also serves as a cushion against road shocks, whereas in the intermediate driving ratio the fluid coupling is not used, therefore, giving quick acceleration to the vehicle. The table, Figure 8, clearly indicated the clutch engagements, speed and torque ratios that prevail during the operation of the transmission.

Figure 9 represents the nomogram of the output shaft speed of transmission constructed according to Figures 1, 3, 5 and 7, having gears with the tooth numbers as indicated above. If the relative speed of the carrier 29 is .600 as compared to unity speed of the feed-back pinion 24, a horizontal line drawn from .600 on the vertical — "speed of carrier 19" — to the inclined line and a vertical drawn from this intersection to the horizontal — "Speed of output shaft 28" — will indicate the speed and direction of the shaft 28. It may be observed that the low gear forward ration is about the same numerically as the reverse gear ratio but opposite in direction, of course.

Figure 10 illustrates a five-speed forward, single reverse ratio transmission, which is obtained by the addition of another planetary gear set composed of the planet pinions 37 which are integral with the pinions 30 and 31 on the planet carrier 29 and the sun gear 38, the latter is connected to a brake drum 39. A brake element D is provided to lock the sun gear 38 to the transmission casing 32.

In all other respects the transmission is identical with that shown in Figure 1. The ratio of the gears 37 and 38 is chosen to give a second intermediate forward ratio which is approximately in geometric progression with the outer ratios when the sun gear 38 is held stationary. An overdrive is also obtained when the clutch C is also engaged, clutches A and B being disengaged at that time.

For example, the number of teeth in this added gear set may be as follows:

| | Teeth |
|---|---|
| Planet gear 37 | 59 |
| Sun gear 38 | 23 |

In all driving ratios except direct and overdrive the entire engine power is transmitted thru the fluid coupling 11—16, while in direct and overdrive a portion of the engine power is directly transmitted to the gearing as can readily be seen from the tabulation of the speed and torque ratios shown in Figure 11. As previously pointed out the efficiency of operation of the fluid coupling is thereby improved and yet the cushioning features imparted by the fluid drive have been retained. It should be also pointed out that the clutch torques do not exceed the engine torque at any time.

The construction of the transmission shown in Figure 12 differs from that of Figure 10 in that the internal gear 17 is directly connected to the drive shaft 10 and the fluid coupling member 11, resulting in a transmission in which the engine power is applied directly to gearing except in reverse drive and the cushioning effect of the fluid coupling would only be beneficial in the low and direct gear ratios, in both cases the fluid coupling delivers regenerative power from pinion 24 to the internal gear 17, i. e., the fluid coupling member 16 now drives the fluid coupling member 11. The clutch engagements, speed and torque ratios pertaining to this form of the transmission are tabulated in Figure 13.

The form of the transmission shown in Figure 14 omits the clutch C and the clutch drum 13 of the two preceeding constructions, but in all other respects it is identical. The engine power is transmitted in all the driving ratios thru the fluid coupling, see Figure 15. No overdrive is available when clutch C is omitted.

The form of the transmission shown in Figure 16 differs from that of Figure 14 in respect to the connection of internal gear 17. In this construction gear 17 is connected to the drive shaft 10 and fluid coupling element 11, resulting in a transmission in which the engine power in the low and the intermediate ratios is applied directly to the gears and in direct and reverse drive the engine power passes thru the fluid coupling whose cushioning quality is also available in the low gear ratios where the coupling again serves to transmit regenerative power from the feed-back pinion 24 thru the clutch A to the element 16, see table, Figure 17.

A further modified form is that shown in Figure 18 by means of which a greater speed reduction and torque multiplication in low gear is obtained. The speed ratios are again arranged approximately in geometric progression and for example the number of teeth may be as follows:

| | Teeth |
|---|---|
| Internal gear 17 | 72 |
| Sun gear 15 | 48 |
| Planet gears 20 | 12 |
| Brake gear 22 | 45 |
| Feed-back pinion 24 | 21 |
| Second intermediate pinion 38 | 32 |
| Planet pinion 30 | 42 |
| Planet pinion 31 | 18 |
| Planet pinion 37 | 31 |

This greater speed reduction is secured by connecting the sun gear 15 to the fluid coupling element 16 and connecting the internal gear 17 to the reaction element 12. The engine power is transmitted in all driving ratios thru the fluid coupling, but there is also available in the direct or high ratio drive a two-path power flow whereby 75% of the engine power can be applied directly to the gearing and only 25% of the engine power need be transmitted thru the fluid coupling whose efficiency is thereby raised resulting in greater economy of operation and still retaining the cushioning effect of the fluid drive connection. The various clutch engagements, speed and torque ratios are tabulated in Figure 19.

A modified form of the above construction is shown in Figure 20 wherein the sun gear 15 is directly connected to the drive shaft 10 and fluid coupling element 11. By this means the engine power is directly applied to the gears in the lower forward speed ratios whereas in direct or high and reverse drives the entire engine power passes thru the fluid coupling.

In the low ratio the beneficial cushioning effect of the coupling, however, is available as the latter transmits regenerative power to the drive shaft 10 and sun gear 15, as tabulated in Figure 21.

Figure 22:
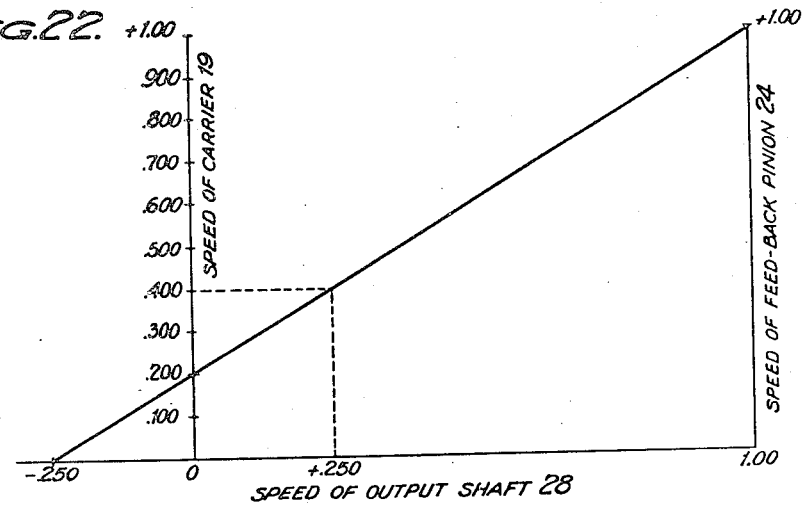
Figure 22 shows the relation of the speed of the output shaft when that of the feed-back pinion remains constant and the speed of the planet carrier is varied.

Figure 22 represents the nomogram of the output shaft speed of a transmission constructed according to Figures 18 and 20, having gears with the tooth numbers as stated above.

To make available transmission ratios intermediate of the forms described and shown in the drawings the planetary gear assembly consisting of the sun gear 15, internal gear 17 and planet pinions 20 is replaced by an assembly composed of the bevel gears 15—17 and bevel pinions 20.

In Figure 23 the bevel gear 17 is connected to the fluid coupling element 16 and the bevel gear 15 is connected to the reaction element 12.

The speed ratios are again arranged approximately in geometric progression and for example the number of teeth may be as follows:

| | Teeth |
|---|---|
| Brake gear 22 | 40 |
| Feed-back pinion 24 | 20 |
| Second intermediate pinion 38 | 22 |
| Planet pinion 30 | 40 |
| Planet pinion 31 | 20 |
| Planet pinion 37 | 38 |

The engine power is transmitted in all driving ratios thru the fluid coupling, but there is also available in the direct and overdrive ratios a two-path power flow whereby 67% of the engine power is applied directly thru the clutch C to bevel gear 15 and only 33% of the engine power is transmitted thru the fluid coupling whose efficiency is thereby increased and better economy is obtained, while at the same time the cushioning quality of the fluid coupling is retained. Figure 24 depicts the clutch engagements, speed and torque ratios of the construction shown in Figure 23.

A further modified form of the transmission is shown in Figure 25 in which the bevel gear 17 is directly connected to the drive shaft 10 and fluid coupling element 11.

By this manner the engine power is applied in all forward driving ratios directly to the gearing, the fluid coupling transmitting regenerative power to the drive shaft only in the low and direct ratios. In reverse, however, the entire engine power is transmitted thru the fluid coupling.

Figure 26 shows the various clutch positions, speed and torque ratios that pertain to this form of construction.

Figure 27:
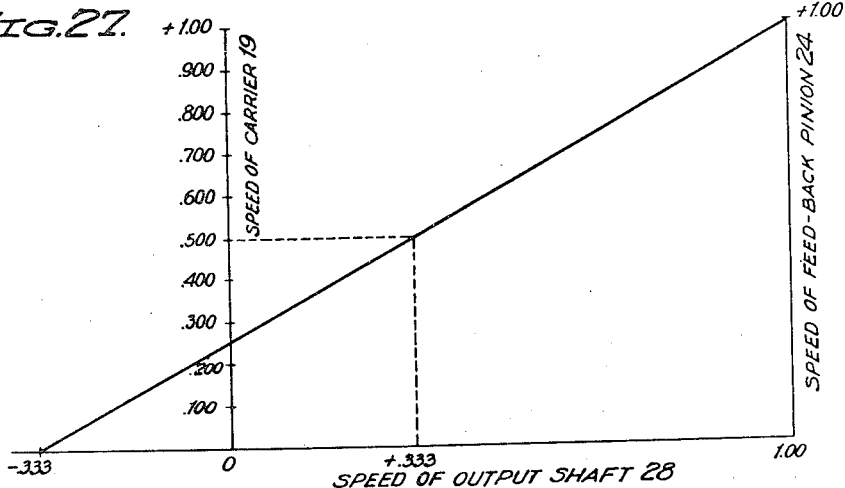
Figure 27 shows the relation of the speed of the output shaft when that of the feed-back pinion remains constant and the speed of the planet carrier is varied.

Figure 27 represents the nomogram for obtaining the output shaft speed of a transmission constructed according to Figures 23 and 25 and having gears with the tooth numbers as indicated above.

The transmission shown in Figure 1 can be further modified for use with rear mounted engines by the addition of a brake drum 39 and a brake D secured to the transmission case or frame of the vehicle. A bevel pinion 40 is secured to the planet carrier 29 which meshes with the differential bevel gear 41 of the rear axle. Overdrive may be had by preventing the rotation of feedback pinion 24 by brake D and the engagement of clutch C.

A modification of the above is shown in Figure 29 where the internal gear 17 is directly connected to the drive shaft 10 and fluid coupling 11, whereas, in Figure 28 the internal gear 17 is connected to the fluid coupling element 16.

Figure 30:
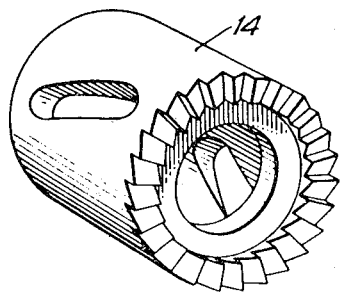
Figure 30 is an isometric view of the self-engaging and self disengaging clutch of the torque reaction member of the transmission.

The self-engaging and self-disengaging brake 14 is shown in detail in Figure 30. It is essentially a hollow cylinder one end of which is provided with jaw teeth suitable for engagement with similar teeth on the slidable double jaw element 34. Two or more helical slots are provided into which cylindrical pins integral with the elongated hub of the reaction element project. This hollow cylinder is rotatably mounted in this elongated hub and it is further provided with a short, small bore which has oil drag contact with the tubular section 21 of the planet pinion carrier 19.

In operation a difference in angular speed, as well as direction of rotation between the brake 14 and the tubular section 21 of the carrier 19 will cause the pins in the helical slots to force the brake into engagement with the mating teeth of the slidable double jaw element 34.

Disengagement will take place as soon as a reversal of rotation of the reaction element occurs, i. e., when the reaction element commences to turn in the same direction as the drive shaft.

The construction of the clutches A, B, C or brake D as shown in Figures 31 and 32 will now be described in detail. The clutching element is a snubbing type friction band but in this instance the design is such that the clutch may be operated in either direction with equal facility and efficiency.

The clutch band 50 is lined with friction material 51 and in its disengaged position there is running clearance between it and the clutch drum 26. At each end of the band 50 the lugs 52 are fastened which provide a fulcrum 53 for the toggle links 54 and 55 and the spring levers 56. The toggle levers 54 and 55 pivot on the pin 57 on which is centrally mounted the cam roller 58. The spring levers 56 are pivoted by means of the pins 59 on the hub 16a of the fluid coupling 16 which is recessed to receive the cam arm 60 whose double cam surfaces 61 and 62 engage with the cam roller 58 and at whose opposite end the electromagnet 63 is attached.

The cam arm 60 is made in two parts and is fastened together by the screws 64. The hub 16a is also provided with the lugs 65 on which the lower ends of the springs 66 rest, while their upper ends press against the lugs 67 of the spring levers 56, whose angular motion in one direction is limited by the stop lug 68 which is integral with hub 16a. An armature 69 is fastened to the feed back element 23 and whenever the electromagnet is energized it will be attracted to the armature and if a difference in rotary speed between the element 16 and 23 prevails this will cause the cam 62 to spread the friction band 50 due to the straightening of the toggle links 54 and 55 and connect the elements 16 and 23, either of which may be the driver. The hub 16a is provided with copper rings 70, properly insulated, to which electric current may be applied thru the brushes 71 from the battery of the automobile and wires 72 and 73 make suitable connection with the electromagnet 63 from the rings 70. When the electromagnet 63 is deenergized the pressure of the springs 66 will open the friction band 50 and disconnect the elements 16 and 23.

The construction of clutches A, B, C and brake D may be identical or they may be so proportioned to suit special requirements. It is well known that a clutch may take the same form as a brake, one of its members then remaining stationary, therefore, these terms should be so interpreted in the claims.

Having thus described the invention, what is claimed as new and desired to be secured by Letters Patent is:

1. A variable speed transmission comprising in combination, a drive shaft, a driven shaft, a hydraulic coupling, one element of which is connected to the drive shaft, an internal gear connected to the other element of the coupling, a first reaction member including a sun gear and brake means therefor, a first planet pinion carrier, planet pinions on said carrier meshing with said internal gear and said sun gear, a pinion integral with said carrier, a feed-back pinion, clutch means for connecting the internal gear and the feed-back pinion, a second reaction member including a sun gear and brake means therefor, a second planet pinion carrier connected to the driven shaft, compound planet pinions on said second carrier meshing with said first pinion, said feed-back pinion and the sun gear of the second reaction member, stationary brake means co-operating with the brake means of the first reaction member to prevent the rotation of the sun gear in a direction opposite to that of the drive shaft and thereby cause the transmission to operate in a low gear ratio when the feed-back pinion is clutched to the internal gear.

2. A variable speed transmission comprising in combination, a drive shaft, a driven shaft, a hydraulic coupling, one element of which is connected to the drive shaft, an internal gear connected to the other element of the coupling, a first reaction member including a sun gear and slidable brake means therefor, a first planet pinion carrier, planet pinions on said carrier meshing with said internal gear and said sun gear, a pinion connected to said carrier, a feed-back pinion, first clutch means for connecting said internal gear and said feed-back pinion, a second reaction member including a sun gear and brake means therefor, second clutch means for connecting said feed-back pinion and said first carrier, a second planet pinion carrier connected to the driven shaft, compound planet pinions on said second carrier meshing with the pinion connected to the first carrier, the feed-back pinion and the sun gear of the second reaction member, stationary brake means cooperating with the brake means of the first reaction member to prevent the rotation of the sun gear in a direction opposite to that of the drive shaft and thereby cause the transmission to operate in the first intermediate gear ratio when the second clutch means connects the feed-back pinion and said first carrier.

3. A variable speed transmission comprising in combination, a drive shaft, a driven shaft, a hydraulic coupling one element of which is connected to the drive shaft, an internal gear connected to the other element of the coupling, a first reaction member including a sun gear and slidable brake means therefor, a first planet pinion carrier, planet pinions on said carrier meshing with said internal gear and said sun gear, a pinion connected to said carrier, a feed-back pinion, first clutch means for connecting said internal gear and said feed-back pinion, a second reaction member including a sun gear and brake means therefor, second clutch means for connecting said feed-back pinion and said first carrier, a second planet pinion carrier connected to the driven shaft, compound planet pinions on said second carrier meshing with the pinion connected to the first carrier, the feed-back pinion and the sun gear of the second reaction member, stationary brake means cooperating with the brake means of the second reaction member to prevent the rotation of the sun gear in a direction opposite to that of the drive shaft and thereby cause the transmission to operate in the second intermediate gear ratio when the brake means of the second reaction member is engaged.

4. A variable speed transmission comprising in combination, a drive shaft, a driven shaft, a hydraulic coupling, one element of which is connected to the drive shaft, an internal gear connected to the other element of the coupling, a first reaction member including a sun gear and slidable brake means therefor, a first planet pinion carrier, planet pinions on said carrier meshing with said internal gear and said sun gear, a pinion provided with brake means and connected to said carrier, a feed-back pinion, first clutch means for connecting said internal gear and said feed-back pinion, a second reaction member including a sun gear and brake means therefor, a second clutch means for connecting said feed-back pinion and said first carrier, a second planet pinion carrier connected to the driven shaft, compound planet pinions on said second carrier meshing with the pinion connected to said first carrier, the feed-back pinion and the sun gear of the second reaction member, slidably mounted stationary brake means adapted to selectively co-operate with the brake means of the first reaction member or the brake means of the pinion on said first carrier for forward and reverse operation of the transmission respectively when the feed-back pinion is clutched to the internal gear.

5. A variable speed transmission comprising in combination, a drive shaft, a driven shaft, a hydraulic coupling, one element of which is connected to the drive shaft, an internal gear connected to the other element of the coupling, a first reaction member including a sun gear and slidable brake means therefor, a first planet pinion carrier, planet pinions on said carrier meshing with said internal gear and said sun gear, a pinion connected to said carrier, a feed-back pinion, first clutch means for connecting said internal gear and said feed-back pinion, a second reaction member including a sun gear and brake means therefor, second clutch means for connecting said feed-back pinion and said first carrier, a second planet pinion carrier connected to the driven shaft, compound planet pinions on said second carrier meshing with the pinion connected to the first carrier, the feed-back pinion and the sun gear of the second reaction member, stationary brake means co-operating with the brake means of the first reaction member to prevent the rotation of the sun gear in a direction opposite to that of the drive shaft and means to release said sun gear from the stationary brake means when both clutch means are engaged to cause the transmission to operate in the high or direct gear ratio.

6. A variable speed transmission comprising in combination, a drive shaft, a driven shaft, a two element hydraulic coupling, one element of which is connected to the drive shaft, an internal gear connected to the other element of the coupling, a first reaction member including a sun gear and slidable brake means therefor, a first planet pinion carrier, planet pinions on said carrier meshing with said internal gear and said sun gear, a pinion provided with brake means and connected to said carrier, a feed-back pinion, first clutch means for connecting said internal gear and said feed-back pinion, a second reaction member including a sun gear and brake means therefor, second clutch means for connecting said feed-back pinion and said first carrier, third clutch means for connecting the drive shaft and said first reaction member, a second planet pinion carrier connected to the driven shaft, compound planet pinions on said second carrier meshing with the pinion connected to said first carrier, the feed-back pinion and the sun gear of the second reaction member, slidably mounted stationary brake means adapted to selectively co-operate with the brake means of the first reaction member or the brake means of the pinion on said first carrier for forward or reverse operation of the transmission respectively when the feed-back pinion is clutched to the internal gear.

7. A variable speed transmission comprising in combination, a drive shaft, a driven shaft, a two element hydraulic coupling one element of which is connected to the drive shaft, an internal gear connected to the other element of the coupling, a first reaction member including a sun gear and slidable brake means therefor, a first planet pinion carrier, planet pinions on said carrier meshing with said internal gear and said sun gear, a pinion connected to said carrier, a feed-back pinion, first clutch means for connecting said internal gear and said feed-back pinion, a second reaction member including a sun gear and brake means therefor, second clutch means for connecting said feed-back pinion and said first carrier, third clutch means for connecting the drive shaft and said first reaction member, a second planet pinion carrier connected to the driven shaft, compound planet pinions on said second carrier meshing with the pinion connected to the first carrier, the feed-back pinion and the sun gear of the second reaction member, stationary brake means co-operating with the brake means of the first reaction member to prevent the rotation of the sun gear in a direction opposite to that of the drive shaft and thereby cause the transmission to operate in the first intermediate gear ratio when the second clutch means connects the feed-back pinion and said first carrier.

8. A variable speed transmission comprising in combination, a drive shaft, a driven shaft, a two element hydraulic coupling one element of which is connected to the drive shaft, an internal gear connected to the other element of the coupling, a first reaction member including a sun gear and slidable brake means therefor, a first planet pinion carrier, planet pinions on said carrier meshing with said internal gear and said sun gear, a pinion connected to said carrier, a feed-back pinion, first clutch means for connecting said internal gear and said feed-back pinion, a second reaction member including a sun gear and brake means therefor, second clutch means for connecting said feed-back pinion and said first carrier, third clutch means for connecting the drive shaft and said first reaction member, a second planet pinion carrier connected to the driven shaft, compound planet pinions on said second carrier meshing with the pinion connected to the first carrier, the feed-back pinion and the sun gear of the second reaction member, stationary brake means co-operating with the brake means of the second reaction member to prevent the rotation of the sun gear in a direction opposite to that of the drive shaft and thereby cause the transmission to operate in the second intermediate gear ratio when the brake means of the second reaction member is engaged.

9. A variable speed transmission comprising in combination, a drive shaft, a driven shaft, a two element hydraulic coupling, one element of which is connected to the drive shaft, an internal gear connected to the other element of the coupling, a first reaction member including a sun gear and slidable brake means therefor, a first planet pinion carrier, planet pinions on said carrier meshing with said internal gear and said sun gear, a pinion connected to said carrier, a feed-back pinion, first clutch means for connecting said internal gear and said feed-back pinion, a second reaction member including a sun gear and brake means therefor, second clutch means for connecting said feed-back pinion and said first carrier, third clutch means for connecting the drive shaft and said first reaction member, a second planet pinion carrier connected to the driven shaft, compound planet pinions on said second carrier meshing with the pinion connected to the first carrier, the feed-back pinion and the sun gear of the second reaction member, stationary brake means co-operating with the brake means of the first reaction member to prevent the rotation of the sun gear in a direction opposite to that of the drive shaft and means to release said sun gear from the stationary brake means when the first and third or first and second clutch means are engaged to cause the transmission to operate in the high or direct gear ratio.

10. A variable speed transmission comprising in combination, a drive shaft, a driven shaft, a hydraulic coupling one element of which is connected to the drive shaft, an internal gear connected to the other element of the coupling, a first reaction member including a sun gear and slidable brake means therefor, a first planet pinion carrier, planet pinions on said carrier meshing with said internal gear and said sun gear, a pinion connected to said carrier, a feed-back pinion, first clutch means for connecting said internal gear and said feed-back pinion, a second reaction member including a sun gear and brake means therefor, second clutch means for connecting said feed-back pinion and said first carrier, third clutch means for connecting the drive shaft and said first reaction member, a second planet pinion carrier connected to the driven shaft, compound planet pinions on said second carrier meshing with the pinion connected to the first carrier, the feed-back pinion and the sun gear of the second reaction member, stationary brake means cooperating with the brake means of the second reaction member to prevent the rotation of the sun gear in a direction opposite to that of the drive shaft and thereby cause the transmission to operate in the overdrive gear ratio when the third clutch means and the brake means of the second reaction member are engaged.

11. A variable speed transmission comprising in combination, a drive shaft, a driven shaft, a two element hydraulic coupling, one element of which is connected to the drive shaft, a sun gear connected to the other element of the coupling, a first reaction member including an internal gear and slidable brake means therefor, a first planet pinion carrier, planet pinions on said carrier meshing with said internal gear and said sun gear, a pinion provided with brake means and connected to said carrier, a feed-back pinion, first clutch means for connecting said sun gear and said feed-back pinion, a second reaction member including a sun gear and brake means therefor, second clutch means for connecting said feed-back pinion and said first carrier, third clutch means for connecting the drive shaft and said first reaction member, a second planet pinion carrier connected to the driven shaft, compound planet pinions on said second carrier meshing with the pinion connected to said first carrier, the feed-back pinion and the sun gear of the second reaction member, slidably mounted stationary brake means adapted to selectively co-operate with the brake means of the first reaction member or the brake means of the pinion connected to said first carrier for forward or reverse operation of the transmission respectively when the feed-back pinion is clutched to the sun gear.

12. A variable speed transmission comprising in combination, a drive-shaft, a driven shaft, a hydraulic coupling one element of which is connected to the drive shaft, a sun gear connected to the other element of the coupling, a first reaction member including an internal gear and slidable brake means therefor, a first planet pinion carrier, planet pinions on said carrier meshing with said internal gear and said gun gear, a pinion connected to said carrier, a feed-back pinion, first clutch means for connecting said sun gear and said feed-back pinion, a second reaction member including a sun gear and brake means therefor, second clutch means for connecting said feed-back pinion and said first carrier, third clutch means for connecting the drive shaft and said first reaction member, a second planet pinion carrier connected to the driven shaft, compound planet pinions on said second carrier meshing with the pinion connected to the first carrier, the feed-back pinion and the sun gear of the second reaction member, stationary brake means co-operating with the brake means of the first reaction member to prevent the rotation of the sun gear in a direction opposite to that of the drive shaft and thereby cause the transmission to operate in the first intermediate gear ratio when the second clutch means is engaged.

13. A variable speed transmission comprising in combination, a drive shaft, a driven shaft, a hydraulic coupling one element of which is connected to the drive shaft, a sun gear connected to the other element of the coupling, a first reaction member including an internal gear and slidable brake means therefor, a first planet pinion carrier, planet pinions on said carrier meshing with said internal gear and said sun gear, a pinion connected to said carrier, a feed-back pinion, first clutch means for connecting said sun gear and said feed-back pinion, a second reaction member including a sun gear and brake means therefor, second clutch means for connecting said feed-back pinion and said first carrier, third clutch means for connecting the drive shaft and said first reaction member, a second planet pinion carrier connected to the driven shaft, compound planet pinions on said second carrier meshing with the pinion connected to the first carrier, the feed-back pinion and the sun gear of the second reaction member, stationary brake means co-operating with the brake means of the second reaction member to prevent the rotation of the sun gear in a direction to that of the drive shaft and thereby cause the transmission to operate in the second intermediate gear ratio when the brake means of the second reaction member is engaged.

14. A variable speed transmission comprising in combination, a drive shaft, a driven shaft, a two element hydraulic coupling, one element of which is connected to the drive shaft, a sun gear connected to the other element of the coupling, a first reaction member including an internal gear and slidable brake means therefor, a first planet pinion carrier, planet pinions on said carrier meshing with said internal gear and said sun gear, a pinion connected to said carrier, a feed-back pinion, first clutch means for connecting said sun gear and said feed-back pinion, a second reaction member including a sun gear and brake means therefor, second clutch means for connecting said feed-back pinion and said first carrier, third clutch means for connecting the drive shaft and said first reaction member, a second planet pinion carrier connected to the driven shaft, compound planet pinions on said second carrier meshing with the pinion connected to the first carrier, the feed-back pinion and the sun gear of the second reaction member, stationary brake means co-operating with the brake means of the first reaction member to prevent the rotation of the sun gear in a direction opposite to that of the drive shaft and means to release said sun gear from the stationary brake means when the first and third or first and second clutch means are engaged to cause the transmission to operate in the high or direct gear ratio.

15. A variable speed transmission comprising in combination, a drive shaft, a driven shaft, a two element hydraulic coupling, one element of which is connected to the drive shaft, a bevel gear connected to the drive shaft, a first reaction member including a bevel gear and slidable brake means therefor, a first planet pinion carrier, bevel planet pinions on said carrier meshing with said bevel gears, a pinion connected to said carrier, a feed-back pinion, clutch means for connecting the other element of said hydraulic coupling and the feed-back pinion, a second reaction member including a sun gear and brake means therefor, a second planet pinion carrier connected to the driven shaft, compound planet pinions on said second carrier meshing with said first pinion, said feed-back pinion and the sun gear of the second reaction member, stationary brake means co-operating with the brake means of the first reaction member to prevent the rotation of the bevel gear in a direction opposite to that of the drive shaft and thereby cause the transmission to operate in a low gear ratio when the feed-back pinion is clutched to said other element of the hydraulic coupling.

16. A variable speed transmission comprising in combination a drive shaft, a driven shaft, a two element hydraulic coupling, one element of which is connected to the drive shaft, a bevel gear connected to the drive shaft, a first reaction member including a bevel gear and slidable brake means therefor, a first planet pinion carrier, bevel planet pinions on said carrier meshing with said bevel gears, a pinion provided with brake means and connected to said carrier, a feed-back pinion, first clutch means for connecting the other element of said hydraulic coupling and said feedback pinion, a second reaction member including a sun gear and brake means therefor, second clutch means for connecting said feed-back pinion and said first carrier, a second planet pinion carrier connected to the driven shaft, compound planet pinions on said second carrier meshing with the pinion connected to said first carrier, the feed-back pinion and the sun gear of the second reaction member, slidably mounted stationary brake means adapted to selectively co-operate with the brake means of the first reaction member or the brake means of the pinion on said first carrier for forward and reverse operation of the transmission respectively when the feed-back pinion is clutched to said other element of the hydraulic coupling.

17. A variable speed transmission comprising in combination, a drive shaft, a driven shaft, a two element hydraulic coupling, one element of which is connected to the drive shaft, a bevel gear connected to the drive shaft, a first reaction member including a bevel gear and slidable brake means therefor, a first planet pinion carrier, bevel planet pinions on said carrier meshing with said bevel gears, a pinion connected to said carrier, a feed-back pinion, first clutch means for connecting the other element of said hydraulic coupling and said feed-back pinion, a second reaction member including a sun gear and brake means therefor, second clutch means for connecting the feed-back pinion and said first carrier, a second planet pinion carrier connected to the driven shaft, compound planet pinions on said second carrier meshing with the pinion connected to the first carrier, the feed-back pinion and the sun gear of the second reaction member, stationary brake means co-operating with the brake means of the first reaction member to prevent the rotation of the bevel gear in a direction opposite to that of the drive shaft and thereby cause the transmission to operate in the first intermediate gear ratio when the second clutch means connects the feed-back pinion and said first carrier.

18. A variable speed transmission comprising in combination, a drive shaft, a driven shaft, a two element hydraulic coupling, one element of which is connected to the drive shaft, a bevel gear connected to the drive shaft, a first reaction member including a bevel gear and slidable brake means therefor, a first planet pinion carrier, bevel planet pinions on said carrier meshing with said bevel gears, a pinion connected to said carrier, a feed-back pinion, first clutch means for connecting the other element of the hydraulic coupling and said feed-back pinion, a second reaction member including a sun gear and brake means therefor, second clutch means for connecting said feed-back pinion and said first carrier, a second planet pinion carrier connected to the driven shaft, compound planet pinions on said second carrier meshing with the pinion connected to the first carrier, the feed-back pinion and the sun gear of the second reaction member, stationary brake means co-operating with the brake means of the second reaction member to prevent the rotation of the sun gear in a direction opposite to that of the drive shaft and thereby cause the transmission to operate in the second intermediate gear ratio when the brake means of the second reaction member is engaged.

19. A variable speed transmission comprising in combination, a drive shaft, a driven shaft, a two element hydraulic coupling, one element of which is connected to the drive shaft, a bevel gear connected to the drive shaft, a first reaction member including a bevel gear and slidable brake means therefor, a first planet pinion carrier, bevel planet pinions on said carrier meshing with said bevel gears, a pinion connected to said carrier, a feed-back pinion, first clutch means for connecting the other element of said hydraulic coupling and said feed-back pinion, a second reaction member including a sun gear and brake means therefor, second clutch means for connecting said feed-back pinion and said first carrier, a second planet pinion carrier connected to the driven shaft, compound planet pinions on said second carrier meshing with the pinion connected to the first carrier, the feed-back pinion and the sun gear of the second reaction member, stationary brake means co-operating with the brake means of the first reaction member to prevent the rotation of the bevel gear in a direction opposite to that of the drive shaft and means to release said sun gear from the stationary brake means when both clutch means are engaged to cause the transmission to operate in the high or direct gear ratio.

20. A variable speed transmission comprising in combination, a drive shaft, a driven shaft, a two element hydraulic coupling, one element of which is connected to the drive shaft, a bevel gear connected to the drive shaft, a first reaction member including a bevel gear and slidable brake means therefor, a first planet pinion carrier, bevel planet pinions on said carrier meshing with said bevel gears, a pinion connected to said carrier, a feed-back pinion, first clutch means for connecting the other element of said hydraulic coupling and said feed-back pinion, second clutch means for connecting said feed-back pinion and said first carrier, third clutch means for connecting the drive shaft and said first reaction member, a second reaction member including a sun gear and brake means therefor, a second planet pinion carrier connected to the driven shaft, compound planet pinions on said second carrier meshing with the pinion connected to the first carrier, the feed-back pinion and the sun gear of the second reaction member, stationary brake means co-operating with the brake means of the first reaction member to prevent the rotation of the bevel gear in a direction opposite to that of the drive shaft and thereby cause the transmission to operate in the low gear ratio when the first clutch means connects the feed-back pinion and the other element of the hydraulic coupling.

21. A variable speed transmission comprising in combination, a drive shaft, a driven shaft, a two element hydraulic coupling, one element of which is connected to the drive shaft, a bevel gear connected to the drive shaft, a first reaction member including a bevel gear and slidable brake means therefor, a first planet pinion carrier, bevel planet pinions on said carrier meshing with said bevel gears, a pinion provided with brake means and connected to said carrier, a feed-back pinion, first clutch means for connecting the other element of said hydraulic coupling and said feed-back pinion, second clutch means for connecting said feed-back pinion and said first carrier, third clutch means for connecting the drive shaft and said first reaction member, a second reaction member including a sun gear and brake means therefor, a second planet pinion carrier connected to the driven shaft, compound planet pinions on said second carrier meshing with the pinion connected to said first carrier, the feed-back pinion and the sun gear of the second reaction member, slidably mounted stationary brake means adapted to selectively co-operate with the brake means of the first reaction member of the brake means of the pinion on said first carrier for forward or reverse operating of the transmission respectively when the feed-back pinion is clutched to said other element of the hydraulic coupling.

22. A variable speed transmission comprising in combination, a drive shaft, a driven shaft, a two element hydraulic coupling, one element of which is connected to the drive shaft, a bevel gear connected to the drive shaft, a first reaction member including a bevel gear and slidable brake means therefor, a first planet pinion carrier, bevel planet pinions on said carrier meshing with said bevel gears, a pinion connected to said carrier, a feed-back pinion, first clutch means for connecting the other element of said hydraulic coupling and said feed-back pinion, second clutch means for connecting said feed-back pinion and said first carrier, third clutch means for connecting the drive shaft and said first reaction member, a second reaction member including a sun gear and brake means therefor, a second planet pinion carrier connected to the driven shaft, compound planet pinions on said second carrier meshing with the pinion connected to the first carrier, the feed-back pinion and the sun gear of the second reaction member, stationary brake means co-operating with the brake means of the first reaction member to prevent the rotation of the bevel gear in a direction opposite to that of the drive shaft and thereby cause the tranmission to operate in the first intermediate gear ratio when the second clutch means connects the feed-back pinion and said first carrier.

23. A variable speed transmission comprising in combination, a drive shaft, a driven shaft, a two element hydraulic coupling, one element of which is connected to the drive shaft, a bevel gear connected to the drive shaft, a first reaction member including a bevel gear and slidable brake means therefor, a first planet pinion carrier, bevel planet pinions on said carrier meshing with said bevel gears, a pinion connected to said carrier, a feed-back pinion, first clutch means for connecting the other element of said hydraulic coupling and said feed-back pinion, second clutch means for connecting said feed-back pinion and said first carrier, third clutch means for connecting the drive shaft and said first reaction member, a second reaction member including a sun gear and brake means therefor, a second planet pinion carrier connected to the driven shaft, compound planet pinions on said second carrier meshing with the pinion connected to the first carrier, the feed-back pinion and the sun gear of the second reaction member, stationary brake means co-operating with the brake means of the second reaction member to prevent the rotation of the sun gear in a direction opposite to that of the drive shaft and thereby cause the transmission to operate in the second intermediate gear ratio when the brake means of the second reaction member is engaged.

24. A variable speed transmission comprising in combination, a drive shaft, a driven shaft, a two element hydraulic coupling, one element of which is connected to the drive shaft, bevel gear connected to the drive shaft, a first reaction member including a bevel gear and slidable brake means therefor, a first planet pinion carrier, bevel planet pinions on said carrier meshing with said bevel gears, a pinion connected to said carrier, a feed-back pinion, first clutch means for connecting the second element of said hydraulic coupling and said feed-back pinion, second clutch means for connecting said feed-back pinion and said first carrier, third clutch means for connecting the drive shaft and said first reaction member, a second reaction member including a sun gear and brake means therefor, a second planet pinion carrier connected to the driven shaft, compound planet pinions on said carrier meshing with the pinion connected to the first carrier, the feed-back pinion and the sun gear of the second reaction member, stationary brake means co-operating with the brake means of the first reaction member to prevent the rotation of the bevel gear in a direction opposite to that of the drive shaft and means to release said bevel gear from the stationary brake means when the first and third clutch means are engaged to cause the transmission to operate in the high or direct gear ratio.

25. A variable speed transmission comprising in combination, a drive shaft, a driven shaft, a two element hydraulic coupling, one element of which is connected to the drive shaft, a bevel gear connected to the drive shaft, a first reaction member including a bevel gear and slidable brake means therefor, a first planet pinion carrier, bevel planet pinions on said carrier meshing with said bevel gears, a pinion connected to said carrier, a feed-back pinion, first clutch means for connecting the second element of said hydraulic coupling and said feed-back pinion, second clutch means for connecting said feed-back pinion and said first carrier, third clutch means for connecting the drive shaft and said first reaction member, a second reaction member including a sun gear and brake means therefor, a second planet pinion carrier connected to the driven shaft, compound planet pinions on said carrier meshing with the pinion connected to the first carrier, the feed-back pinion and the sun gear of the second reaction member, stationary brake means co-operating with the brake means of the first reaction member to prevent the rotation of the bevel gear in a direction opposite to that of the drive shaft and means to release said bevel gear from the stationary brake means when the first and second, or second and third clutch means are engaged to cause the transmission to operate in the high or direct gear ratio.

26. A variable speed transmission comprising in combination, a drive shaft, a driven shaft, a two element hydraulic coupling, one element of which is connected to the drive shaft, a bevel gear connected to the drive shaft, a first reaction member including a bevel gear and slidable brake means therefor, a first planet pinion carrier, bevel planet pinions on said carrier meshing with said bevel gears, a pinion connected to said carrier, a feed-back pinion, first clutch means for connecting the other element of said hydraulic coupling and said feed-back pinion, second clutch means for connecting said feed-back pinion and said first carrier, third clutch means for connecting the drive shaft and said first reaction member, a second reaction member including a sun gear and brake means therefor, a second planet pinion carrier connected to the driven shaft, compound planet pinions on said second carrier meshing with the pinion connected to the first carrier, the feed-back pinion and the sun gear of the second reaction member, stationary brake means co-operating with the brake means of the second reaction member to prevent the rotation of the sun gear in a direction opposite to that of the drive shaft and thereby cause the transmission to operate in the overdrive gear ratio when the third clutch means and the brake means of the second reaction member are engaged.

27. A variable speed transmission comprising in combination, a drive shaft, a driven shaft, a hydraulic coupling, one element of which is connected to the drive shaft, a first gear connected to one of the elements of said hydraulic coupling, a reaction member including a second gear and slidable brake means therefor, a first planet pinion carrier, planet pinions on said carrier meshing with said first gear and said second gear, a pinion provided with brake means and connected to said carrier, a feed-back pinion, first clutch means for connecting said feed-back pinion and the other element of said hydraulic coupling, second clutch means for connecting said feed-back pinion and said first carrier, a second planet pinion carrier connected to the driven shaft, compound planet pinions on said second carrier meshing with said first pinion and said feed-back pinion, slidably mounted stationary brake means adapted to selectively engage with the brake means of the reaction member or the brake means of the pinion on said first carrier for forward or reverse operation of the transmission respectively.

FREDERICK W. SEYBOLD.

REFERENCES CITED

The following references are of record in the file of this patent:

UNITED STATES PATENTS

| Number | Name | Date |
|---|---|---|
| 1,054,666 | Barker | Mar. 4, 1913 |
| 1,480,239 | Chaplin | Jan. 8, 1924 |
| 2,176,138 | Kelley | Oct. 17, 1939 |
| 2,211,233 | Kelley | Aug. 13, 1940 |
| 2,317,498 | Tipton | Apr. 27, 1943 |
| 2,361,105 | Jandasek | Oct. 24, 1944 |
| 2,374,688 | La Brie | May 1, 1945 |
| 2,377,696 | Kelley | June 5, 1945 |